(12) United States Patent
Samaha

(10) Patent No.: US 8,352,575 B2
(45) Date of Patent: Jan. 8, 2013

(54) SYSTEM AND METHOD FOR A SERVER-BASED FILES AND TASKS BROKERAGE

(76) Inventor: Tareq A. Samaha, Roseville, CA (US)

( * ) Notice: Subject to any disclaimer, the term of this patent is extended or adjusted under 35 U.S.C. 154(b) by 359 days.

(21) Appl. No.: 12/587,921

(22) Filed: Oct. 14, 2009

(65) Prior Publication Data

US 2010/0094996 A1     Apr. 15, 2010

Related U.S. Application Data

(60) Provisional application No. 61/105,260, filed on Oct. 14, 2008.

(51) Int. Cl.
G06F 15/16 (2006.01)

(52) U.S. Cl. .......... 709/219; 709/203

(58) Field of Classification Search .......... 709/225, 709/203, 219, 224; 718/101; 370/216
See application file for complete search history.

(56) References Cited

U.S. PATENT DOCUMENTS

| | | | |
|---|---|---|---|
| 5,329,619 A | 7/1994 | Page et al. | |
| 5,956,509 A | 9/1999 | Kevner | |
| 6,138,158 A * | 10/2000 | Boyle et al. | 709/225 |
| 6,289,212 B1 * | 9/2001 | Stein et al. | 455/412.1 |
| 6,742,022 B1 | 5/2004 | King et al. | |
| 6,779,019 B1 | 8/2004 | Mousseau et al. | |
| 6,901,425 B1 | 5/2005 | Dykes et al. | |
| 6,928,479 B1 | 8/2005 | Meyer et al. | |
| 7,450,936 B2 * | 11/2008 | Kim | 455/418 |
| 7,933,974 B2 * | 4/2011 | Shum et al. | 709/219 |
| 2003/0046586 A1 * | 3/2003 | Bheemarasetti et al. | 713/201 |
| 2004/0152451 A1 | 8/2004 | Park | |
| 2005/0256870 A1 * | 11/2005 | Benco et al. | 707/9 |
| 2006/0282521 A1 | 12/2006 | Anderson et al. | |
| 2007/0101407 A1 | 5/2007 | Cheung et al. | |
| 2007/0260674 A1 * | 11/2007 | Shenfield | 709/203 |
| 2007/0296805 A1 * | 12/2007 | Tedenvall et al. | 348/14.01 |
| 2009/0111375 A1 * | 4/2009 | Burns et al. | 455/3.06 |
| 2009/0177800 A1 * | 7/2009 | Gidron et al. | 709/248 |
| 2010/0125526 A1 * | 5/2010 | Hurley et al. | 705/80 |
| 2010/0279673 A1 * | 11/2010 | Sharp et al. | 455/419 |
| 2011/0282974 A1 * | 11/2011 | Cheng | 709/219 |

\* cited by examiner

*Primary Examiner* — Joseph Avellino
*Assistant Examiner* — James Conaway
(74) *Attorney, Agent, or Firm* — Schneck & Schneck; David M. Schneck

(57) ABSTRACT

A server-based files and tasks brokerage system and method are disclosed. In response to receiving a request from a requesting computing device, the server posts the request to a request queue. The request is for a requested mobile telephonic device to perform a task. The server posts a first notification to a first notification queue, in response to receiving the request. The server pushes the first notification to the requested device upon confirming a connection. Upon detecting a first condition of the task being for the requested device to receive a file, the server transfers the file from a file repository. Upon detecting a second condition of the task being for the requested device to send a file, the server transfers the file to the file repository. In response to confirming task completion, the server posts a second notification to a second notification queue associated with the requesting device.

42 Claims, 7 Drawing Sheets

SYSTEM AND METHOD FOR A SERVER-BASED FILES AND TASKS BROKERAGE

CROSS-REFERENCE TO RELATED APPLICATION

This application claims priority from U.S. provisional application No. 61/105,260, filed Oct. 14, 2008.

TECHNICAL FIELD

The present invention relates generally to computing servers and, more specifically, server-based global communication network systems and services.

BACKGROUND

Since the proliferation of the global communication network known as the Internet, the varieties and number of Internet connectable devices have grown steadily. Desktops, notebooks, laptops and other portable and nonportable computers are joined by personal digital assistants (PDAs) as computing devices connectable to the Internet.

Cellular telephones, as examples of wireless telephonic network communication devices, are equipped with processors, memory, software and other components and features of computing devices. Many cellular telephones, and cellular telephone equipped PDAs such as Blackberry and iPhone, are connectable to the Internet. An Internet connection may be made as a wired connection, for example by using a USB cable between the cellular telephone and an Internet connected computer. An Internet connection may be made wirelessly, for example by accessing an Internet portal through the cellular network provider, or by using a wireless router and a wireless network-connectable device.

Often, a computing device or a communication device connected to the Internet makes use of a server, to access data, files or services when such data, files or services are not available directly on the computing or communication device itself. Routers on the Internet can connect multiple devices to a server, or devices to devices, in various combinations. As interconnectivity among devices and servers expands, further improvements are sought. The improvements may enable collaborative efforts, provide access to devices or files, or provide directing of requests or tasks.

SUMMARY

A system and method for a server-based files and tasks brokerage are disclosed. The server is accessible via a global communication network to a plurality of computing devices and to a plurality of mobile telephonic devices. The server is programmed to broker files and tasks for the computing devices and the mobile telephonic devices.

One of the computing devices, acting as a requesting device, may make a request. The request is for a requested one of the mobile telephonic devices to perform a task, as a requested device. The requesting device sends the request via the global communication network to the server.

In response to receiving the request at the server, via the global communication network from the requesting device, the server posts the request to a request queue. The request queue is associated with the requesting device. The request queue communicates with the server.

In response to receiving the request, the server posts a first notification to a first notification queue. The first notification queue is associated with the requested device. The first notification queue communicates with the server. The notification identifies the requesting device.

The server confirms a connection of the requested device to the server via the global communication network. Upon confirming the connection, the server pushes the first notification from the first notification queue to the requested device.

The task for the requested device may have a condition.

Upon a first condition of the task being for the requested device to receive a file, and the server confirming the connection of the requested device to the server via the global communication network, the server transfers the file. The server transfers the file from a file repository to the requested device. The file repository communicates with the server.

Upon a second condition of the task being for the requested device to send the file, and the server confirming the connection of the requested device to the server via the global communication network, the server transfers the file to the file repository. The server transfers the file from the requested device to the file repository.

The server confirms a completion of the task by the requested device. In response to confirming the task completion, the server posts a second notification to a second notification queue. The second notification queue is associated with the requesting device. The second notification queue communicates with the server.

The server is programmed to receive the request, to post the request and to post the first notification, irrespective of connectivity to the server of the requested device. The server is further programmed to push the first notification, to conditionally transfer the file, and to post the second notification irrespective of connectivity to the server of the requesting device.

DETAILED DESCRIPTION

Figure 1:
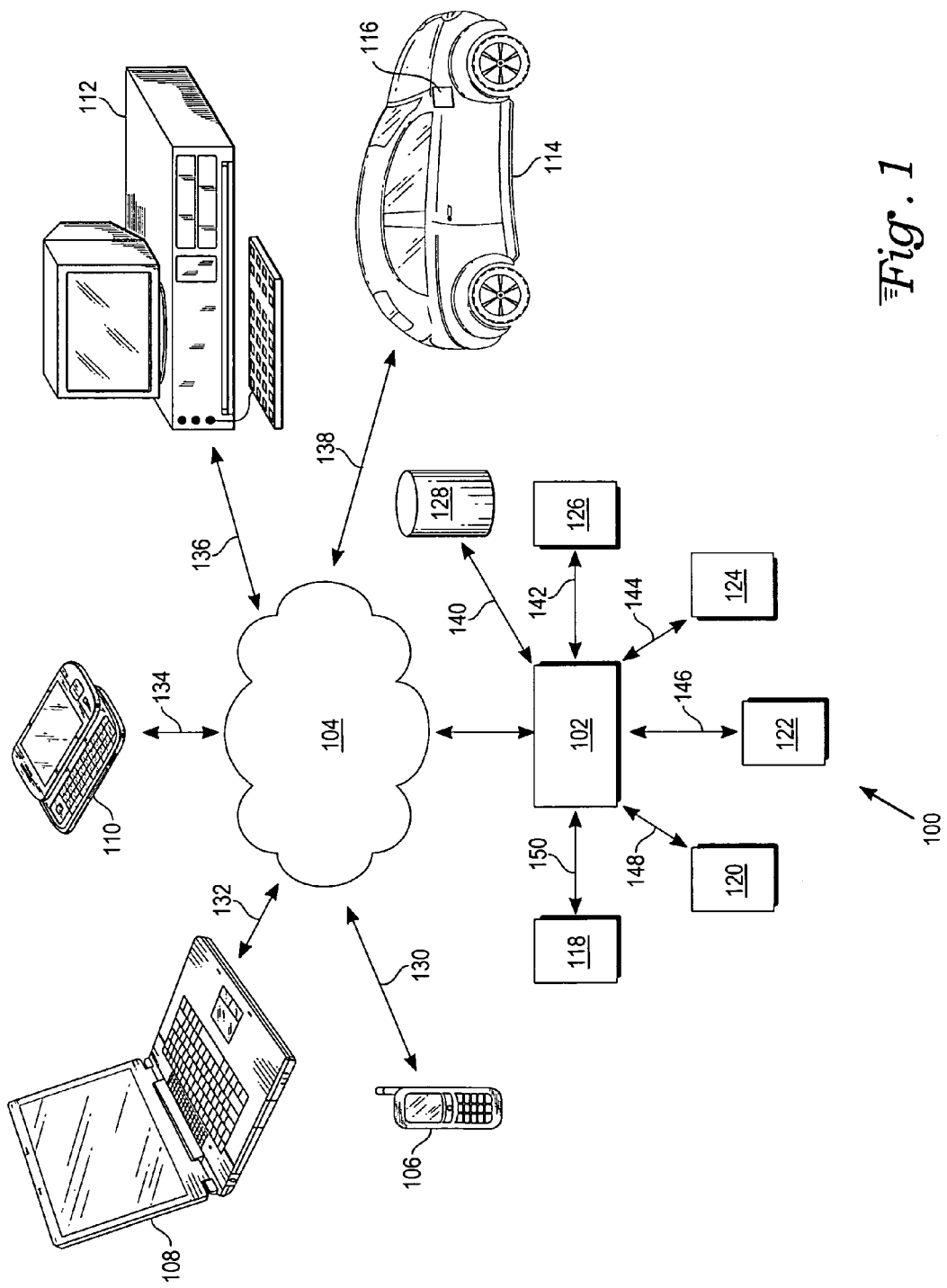
FIG. 1 is a system diagram showing a server-based files and tasks brokerage communicating with global communication network connected devices, in accordance with the present invention.

With reference to FIG. 1, the method and system for a server-based files and tasks brokerage 100 in accordance with the invention allows transfer of files to and from a remote device and directing of tasks to a remote device, featuring a server 102 communicating with various resources to broker the files and tasks. The method and system operate in a manner somewhat analogous to a broker working at a brokerage, a broker being a person who is paid to act as an agent for others in negotiating contracts or buying and selling goods and services.

A global communication network 104 such as the Internet may connect various computing or communication devices 106, 108, 110, 112, 116 to the server 102 over connection paths 130, 132, 134, 136, 138. The server 102 may communicate with various resources 118, 120, 122, 124, 126, including a file repository 128, over connection paths 150, 148, 146, 144, 142, 140, respectively. For example, a communication device such as a mobile telephone 106, a computer such as a notebook computer 108, a communication device 110, a computer such as a desktop computer 112, an interactive automotive electronics device 116 in an automobile 114 or other computing or communication device may connect via the global communication network known as the Internet to the server 102.

Using an embodiment of the server-based files and tasks brokerage 100, a computing device such as the notebook computer 108 may request to transfer a file to or transfer a file from a communication device such as the mobile telephone 106, or may request that the mobile telephone 106 perform a task. The server-based files and tasks brokerage 100 brokers the file or the task. The server-based files and tasks brokerage 100 provides that the request may be made by the requesting device even if the requested device is not connected to the server. The server-based files and tasks brokerage 100 further provides that the file may be transferred to or from the requested device or the task may be performed by the requested device, even if the requesting device is not connected to the server.

Figure 2:
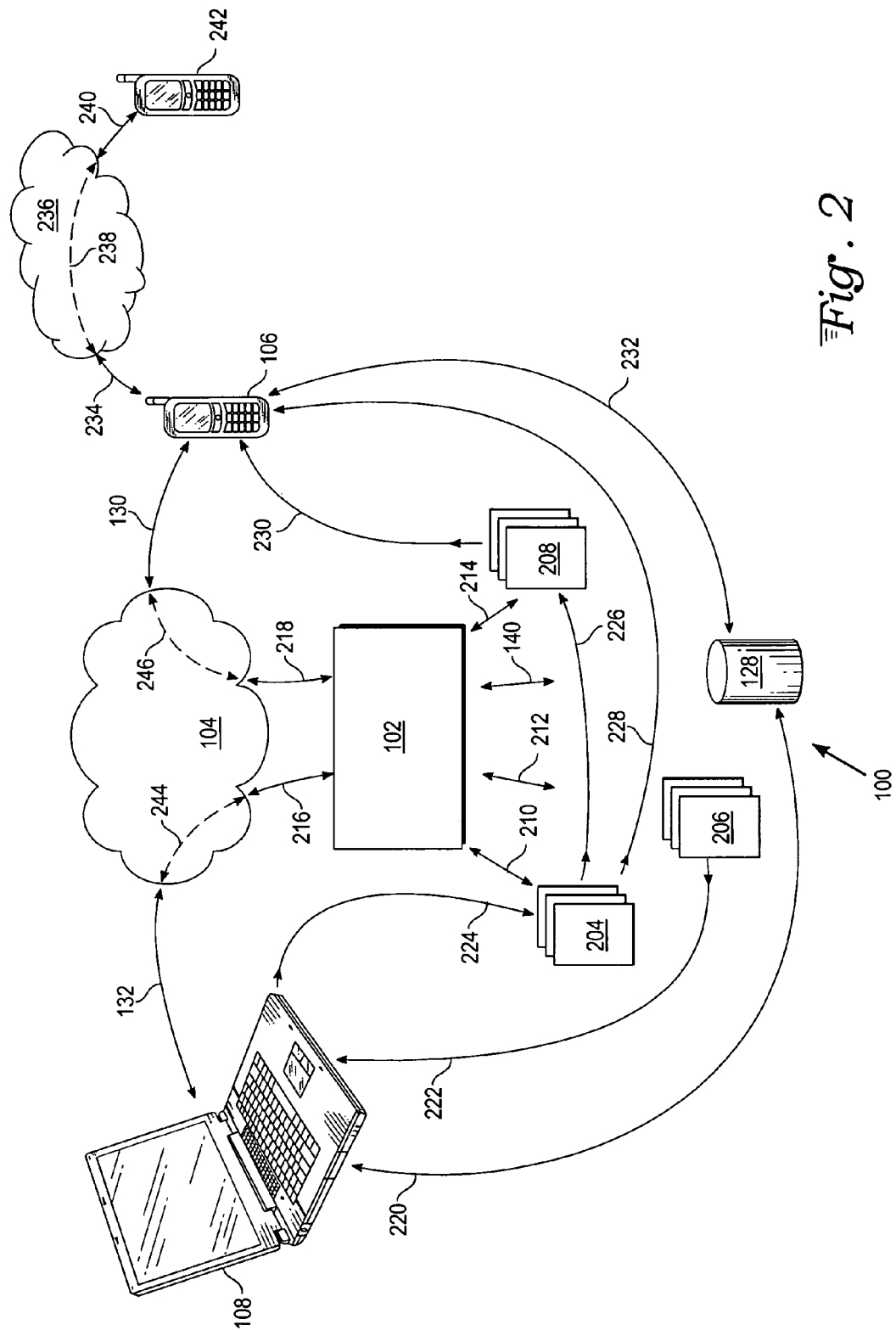
FIG. 2 is a system diagram showing a detail of operation of the server-based files and tasks brokerage of FIG. 1.

With reference to FIG. 2, the notebook computer 108, as a computing device, connects to the global communication network "cloud" 104 over the connection path 132, through the global communication network "cloud" 104 on connection path 244 and to the server 102 on connection path 216. The mobile telephone 106, as a communication device, connects to the global communication network "cloud" 104 over the connection path 130, through the global communication network "cloud" 104 on connection path 246 and to the server 102 on connection path 218.

Other mobile telephonic devices, capable of connecting to both a global communication network and a wireless telephonic network, may be suitable as requested devices. Examples of mobile telephonic devices with dual network capability include the Android phone, the Blackberry, the iPhone and some mobile telephones using Windows Mobile, Symbian or other Mobile Operating System (OS).

The server 102, which may be a computing device operating software and allowing manipulation of or access to data or files, is connected to the global communication network "cloud" 104. A server is a combination of hardware or software designed to provide services, and may include one or more computers, one or more types of server software or one or more types of client software, in a cooperative arrangement. Resources as part of, connected to, or communicating with a server may be in local or distributed locations.

The server 102 communicates with a request queue 204 over connection path 210. The request queue 204 is associated with the requesting device. In an example, the notebook computer 108 is making the request and is the requesting device. Generally, when a plurality of computing or communication devices are connected to the server, each such device acting as a requesting device has an associated request queue. Each queue may be structured as a database having records and attributes, or a queue may be a hardware queue, a firmware queue, a software queue or other structure known in the art.

The server 102 communicates with a first notification queue 208 over connection path 214. The first notification queue 208 is associated with the first notified device. In an example, the mobile telephone 106 is notified that there is a request available at the server 102 for the mobile telephone 106. Generally, when multiple computing or communication devices are connected to the server 102, each such device which may be notified of a request or a result has an associated notification queue.

The server 102 communicates with a second notification queue 206 over connection path 212. The second notification queue 206 is associated with the second notified device. In an example, the notebook computer 108 is notified of the completion of a task, such as the completion of the task requested to the mobile telephone 106. Notification queues may have structures similar to, or differing from, the structure of a request queue. A notification queue or a request queue may make use of one or more flags.

When a number of computing or communication devices connected to the server 102 are making requests, receiving requests, and executing tasks as requested including transferring files to or from devices, the server 102 acts to broker the tasks and files by managing the requests and notifications. The server 102 makes the files being transferred accessible to authorized devices.

In the general case, a requesting device sends a request for a task to be performed by a requested device. The requesting device sends the request to the server 102. The server 102 posts the request in the request queue associated with the requesting device. The server posts a notification to the notification queue associated with the notified device. The notified device picks up the notification from the associated notification queue, picks up the request, performs the task, and coordinates with the server 102 to let the server 102 know the task is completed. The server posts a notification, indicating completion of the task, to the notification queue associated with the requesting device, to let the requesting device know that the task is completed. In this manner, the requesting device becomes a notified device for purposes of notification of completion of the task.

In an example, the task may involve executing a program previously installed on the requested device. If the task does not involve transferring a file, an indication of the completion of the task cues the server to post the notification of the task completion to the requesting device.

If the task does involve transferring a file, the server makes use of a file repository 128. The server communicates with the file repository 128 over the connection path 140. The file repository 128 may be structured as a database having a storage allocation for a set of files or may have another structure known in the art. Completion of a transfer of a file into or out of the file repository 128 may indicate completion of a task to the server, or a separate communication with a device may indicate completion of the task.

With further reference to FIG. 2, various requests and executions of tasks requested may be followed. Information paths symbolically depict information flow indicating the starting and end points of information travel, with information actually flowing over connection paths. Communications between the notebook computer 108 and resources of the server 102, and between the mobile telephone 106 and resources of the server 102, travel through the global communication network "cloud" 104. The notebook computer 108 may request that the mobile telephone 106 receive a file. The notebook computer 108 may transfer a file from the notebook computer to the file repository 128, assisted by the server 102, using information path 220. Further, another device may transfer a file from the device to the file repository 128, or the file may have resided in the file repository 128 for a length of time prior to the making of the request. The notebook computer 108 sends the request to the server 102 via the global communication network. In response to receiving the request, the server 102 posts the request to the request queue 204 associated with the requesting device, using information path 224.

In response to receiving the request and posting the request to the request queue 204, the server posts a notification to the notification queue associated with the notified device, in this case the first notification queue 208 associated with the mobile telephone 106, using information path 226. The preceding actions of receiving the request, posting the request and posting a notification may be performed by the server regardless of connectivity of the notification device, the mobile telephone 106. The mobile telephone 106 need not be connected to the server 102 in order for the server to receive the request from the requesting device and post the request and the notification.

When the mobile telephone 106 connects to the server 102, the mobile telephone 106 checks the first notification queue to see if there is a notification, using information path 230. The mobile telephone 106 may be operating client software, which was previously installed on and directs the actions of the mobile telephone 106. When the mobile telephone determines that the notification indicates a request from a requesting device, the mobile telephone retrieves the request from the request queue of the requesting device. The mobile telephone retrieves the request from the request queue 204, using information path 228.

After interpreting the request, the mobile telephone 106 retrieves the file from the file repository 128 using information path 232. The server pushes the file from the file repository 128 to the mobile telephone 106.

The determination that the file transfer is complete and the task is thus complete may be made by the server 102 or by the mobile telephone 106. In either case, when there is an indication that the task is complete, the server posts a notification of task completion to the second notification queue 206, associated with the notebook computer 108 as the notified device. Operations of notification to the mobile telephone 106, retrieval by the mobile telephone 106 of the request, file retrieval by or file pushing to the mobile telephone 106 and posting of the notification of task completion may all be performed regardless of the connectivity of the requesting device, the notebook computer 108. The notebook computer 108 need not be connected to the server 102 in order for the server 102 to send the notification, the request or the file to the mobile telephone 106 or to post the notification of task completion.

The notebook computer 108 may request that the mobile telephone 106 send a file. Actions of the server receiving and posting the request, posting a notification to the mobile telephone 106, the mobile telephone 106 retrieving the notification and retrieving the request proceed similarly to the preceding example. When the mobile telephone 106 interprets the request, the mobile telephone 106 sends the file from the mobile telephone 106 to the file repository 128 using path 232. The server 102 posts a notification of task completion, similarly to the previous example. The notebook computer 108, upon finding a notification of task completion in the second notification queue 206, may retrieve the file from the file repository 128 using the information path 220.

Figure 3A:
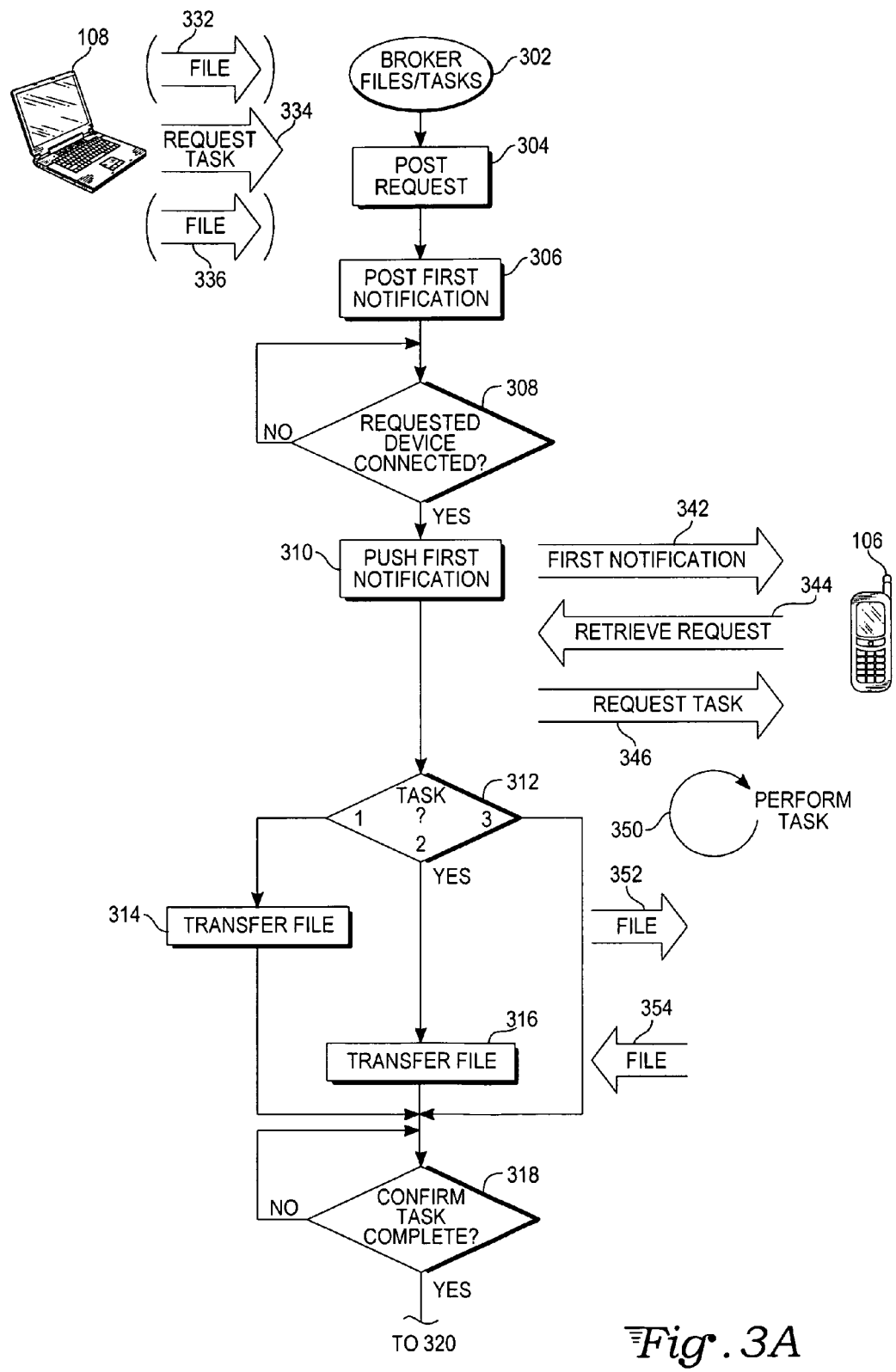
FIG. 3 is a flow diagram of a method for operating the server-based files and tasks brokerage of FIGS. 1 and 2.
Figure 3B:
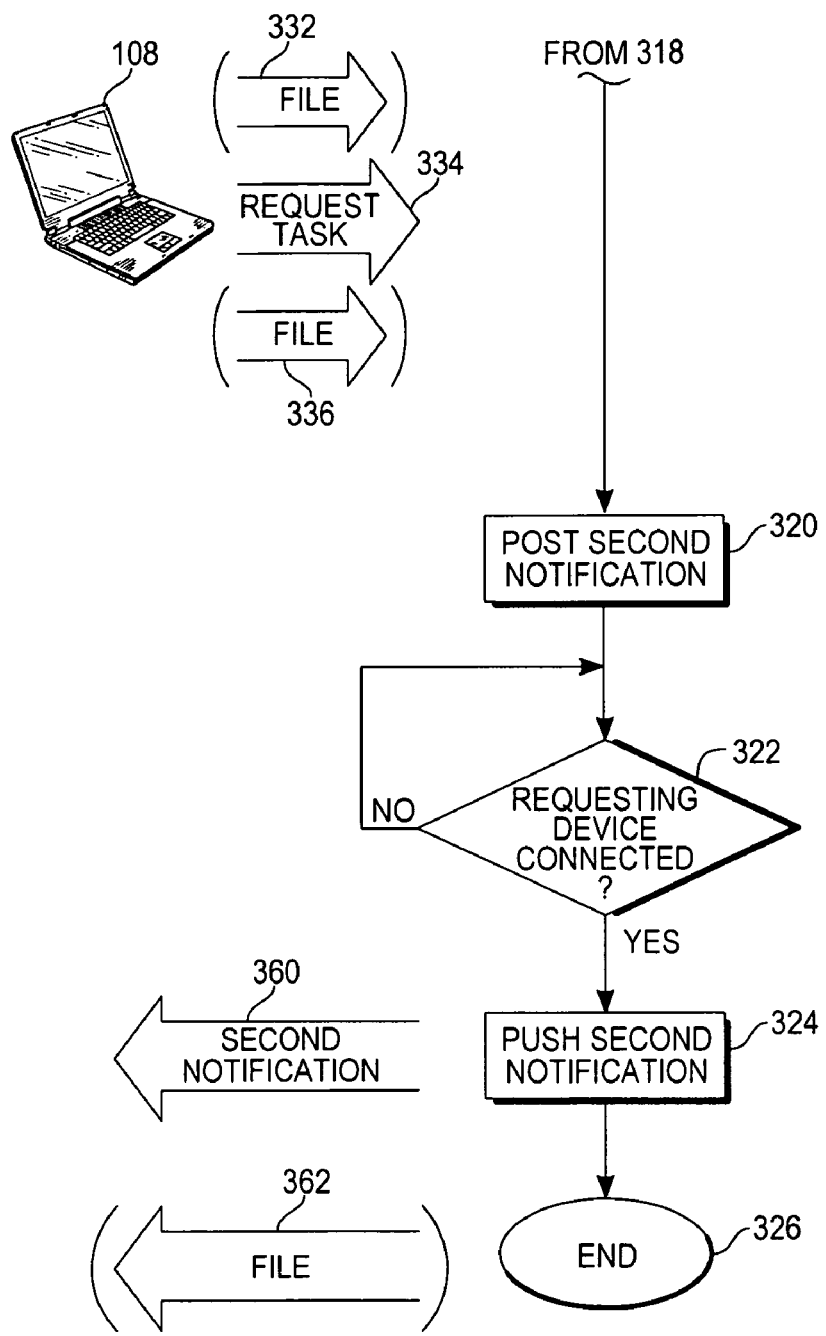

With reference to FIG. 3 the server-based files and tasks brokerage 100 may be operated according to the flow diagram. The method and system make use of presence and push. Presence is defined as detecting a connection of a selected computer or device. A device is considered present if it has the status of a current availability. Push is defined as delivering selected data to a selected computer or device at prescribed intervals or based on some event occurrence that is not dictated by the computer or device to which the data is delivered. Presence and push, as a technique, is delivering or pushing selected data to a selected computer or device upon detecting a connection or presence of the selected computer or device, the detection of the connection being the triggering event. Pulling is defined as receiving selected data when the selected data is requested from a selected computer. That is, pull technology allows the requesting computer or device to trigger the delivery processing, as compared to push technology in which the "terms" of delivery (other than presence) are determined elsewhere. A file transfer may be initiated by a sending device pushing the file or by a receiving device pulling the file.

A computing device such as the notebook computer 108 sends a request 334 for a task to be performed by a communication device such as the mobile telephone 106. If the task includes the communication device receiving a file, and the file is not already in the file repository communicating with the server, the computing device may send the file 332 before sending the request 334 or may send the file 336 after sending the request 334.

Client software, installed on and operating on the server, programs the server to broker 302 files and tasks. The server posts the request 304, in response to receiving the request from the requesting device. The server posts a first notification 306, in response to receiving the request from the requesting device.

The server tracks connectivity of the requested device, in order to determine the presence of the device. If the requested device is not connected or present, the server waits or performs other tasks until the device is connected. If the requested device is connected 308, the server pushes the first notification 310 to the requested device.

The first notification 342 is pushed from the server to the requested device such as the mobile telephone 106. The mobile telephone 106 retrieves the request 344, and the request for a task 346 to be performed by the requested device, namely the mobile telephone 106, is returned from the server to the mobile telephone 106. The mobile telephone 106 or other communication device performs the task 350 in response to retrieving the request.

After sending the notification about the request for a task to be performed, the server determines the nature of the task, and conditionally performs actions. The server determines 312 if a task has a first condition, a second condition or a third condition.

If the server detects that a first condition of the task is for the requested device to receive a file, the server transfers the file 314 to the requested device, in this example the mobile telephone 106. The server transfers the file 314 when the server confirms the connection of the requested device, the mobile telephone 106. The file is transferred 352 to the mobile telephone 106, as part of the mobile telephone performing the task 350, when the task is for the mobile telephone 106 to receive the file.

If the server detects that a second condition of the task is for the requested device to send the file, the server transfers the file 316 when the server confirms the connection of the requested device, the mobile telephone 106. The file is transferred 354 from the mobile telephone 106, as part of the mobile telephone performing the task 350, when the task is for the mobile telephone 106 to send the file.

After determining any applicable condition of the requested task and conditionally performing any applicable action, the server determines if the task is complete. Confirmation of task completion may be based upon a handshake with the requested device, a confirmation or other message from the requested device, the server completing a related task or an examination of the internal server states or processes, or may take another form as known in the art. For example, when the task includes transferring a file to or from the requested device, both the server and the requested device may observe an end of file character, a data transfer count equaling an expected value or other indicator that the file transfer is complete.

If the task is not complete, the server waits or performs other tasks. If the server confirms a completion 318 of the task by the requested device, the server posts a second notification to a second notification queue associated with the requesting device. The server may post a notification to the notebook computer 108 that the mobile telephone 106 has uploaded the file the mobile telephone 106 was requested to receive, has downloaded the file the mobile telephone 106 was requested to send, or has performed the task 350 the mobile telephone 106 was requested to perform.

The server tracks connectivity of the requesting device, in order to determine the presence of the device. If the requesting device is not connected, the server waits or performs other tasks until the device is connected. If the requesting device is connected 322, the server pushes the second notification 324 to the requesting device.

The second notification 360 is pushed from the server to the requesting device, in this example the notebook computer 108. The notebook computer 108 retrieves the second notification. If the notification indicates a file has been sent from the requested device in response to the request being for the requested device to send a file, the requesting device, the notebook computer 108, may retrieve the file 362 from the file repository. At the end 326 of brokering a particular file or task, the process may loop or restart, or multiple processes may be threaded as is known in the art.

The server is programmed to receive the request, to post the request, and to post the first notification, irrespective of connectivity to the server of the requested device. The server is programmed to push the first notification, to conditionally transfer the file, and to post the second notification irrespective of connectivity to the server of the requesting device. The requested device is programmed to retrieve the first notification, to retrieve the request, to perform a task and to send the confirmation irrespective of the connectedness to the server of the requesting device. In this manner a device may request another device to perform a task, even when the other device is not connected to the server or the global communication network. When the task involves a file transfer, the server can hold onto the file in the file repository, even when one, the other or both devices are not connected to the server. While a task is being performed by the other device, the requesting device need not remain connected and will be notified when the connection is again made. This flexibility of operation, with the server brokering files and task requests, fosters improved access, improved connectivity and improved collaboration among devices and users of the devices.

Figure 4:
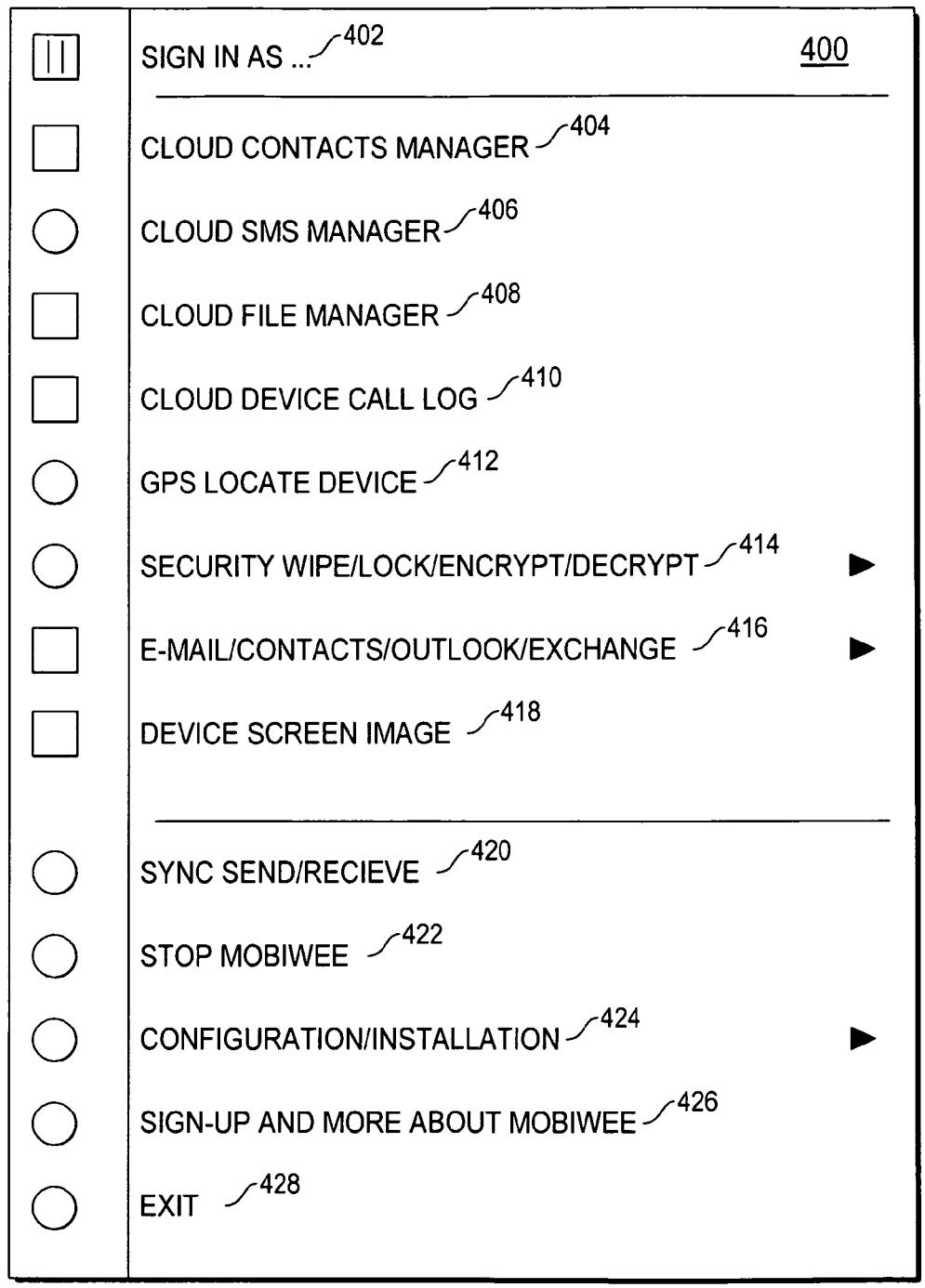
FIG. 4 is a screen menu for selecting functions of the server-based files and tasks brokerage of FIGS. 1 and 2.

With reference to FIG. 4, various functions of the server-based files and tasks brokerage 100 are shown on a screen menu 400. Other functions may be added. The screen menu 400 may be displayed on a display of a requesting device such as the notebook computer 108. The device may be executing client software or may be using a Web browser to connect to the server 102, and the screen menu 400 may be part of the client software or be a webpage sent from the server 102. As used herein, "client software" is programming that is dedicated to enabling the brokerage functions. Typically, client software is proprietary software.

Clicking on the "Sign in As . . . " softbutton 402 brings up a login screen, so that a user may enter and confirm identity. The user then has authorized access to various functions and features of the server-based files and tasks brokerage 100, including files in the file repository requiring permission.

Clicking on the "Cloud Contact Manager" softbutton 404 brings up a contact list with e-mail addresses and/or telephone numbers. The contact list may have been previously downloaded from a communication device, may be uploaded to a communication device, or may be assembled from contact lists of multiple communication devices. A user can remotely backup, restore, delete, or add a new contact, or transfer contacts upon upgrading or loss of a mobile telephone.

Clicking on the "Cloud SMS Manager" softbutton 406 brings up a short message service (SMS) menu, as will be described with reference to FIG. 5.

Clicking on the "Cloud File Manager" softbutton 408 brings up a file manager manual, as will be described with reference to FIG. 6.

Clicking on the "Cloud Device Call Log" softbutton 410 brings up a list showing recent calls made or received on a communication device.

Clicking on the "GPS Locate Device" softbutton 412 brings up data showing the present or most recent location of a global positioning satellite (GPS) receiver-equipped communication device. The GPS communication device may have previously been sent a request to periodically download GPS coordinates for the location of the device. The automatically downloaded coordinates would then be stored in a log file in the file repository, and accessed when the "GPS locate device" softbutton 412 is pressed.

Clicking on the "Security Wipe/Lock/Encrypt/Decrypt" softbutton 414 brings up a menu allowing selection of security functions. A security wipe command sends a request to the requested device to erase a selected type or class of data. A lock command sends a request to the requested device to lock, and only unlock with a correct unlock command, such as the use of a password. An encrypt command sends a request to the requested device to encrypt a file or files or to encrypt future messages or transmissions. A decrypt command sends a request to the requested device to decrypt a file or files or to decrypt future arriving messages or transmissions.

Clicking on the "E-Mail/Contacts/Outlook/Exchange" softbutton 416 brings up a menu allowing e-mail, a contacts list, use of the Outlook address book, and access to setting up an exchange server.

Clicking on the "Device Screen Image" softbutton 418 brings up, on the requesting device, an image of the device screen from a remote device as the requested device.

Clicking on the "Sync Send/Receive" softbutton 420 synchronizes files between a sending device and a receiving device.

Clicking on the "Stop MobiWee" softbutton 422 stops a task currently in progress on the system.

Clicking on the "Configuration/Installation" softbutton 424 brings up a menu for configuring or installing client software.

Clicking on the "Sign-Up and More about MobiWee" softbutton 426 brings up a menu for signing up for a service and information about the service.

Clicking on the "Exit" softbutton 428 exits the screen menu 400.

Figure 5:
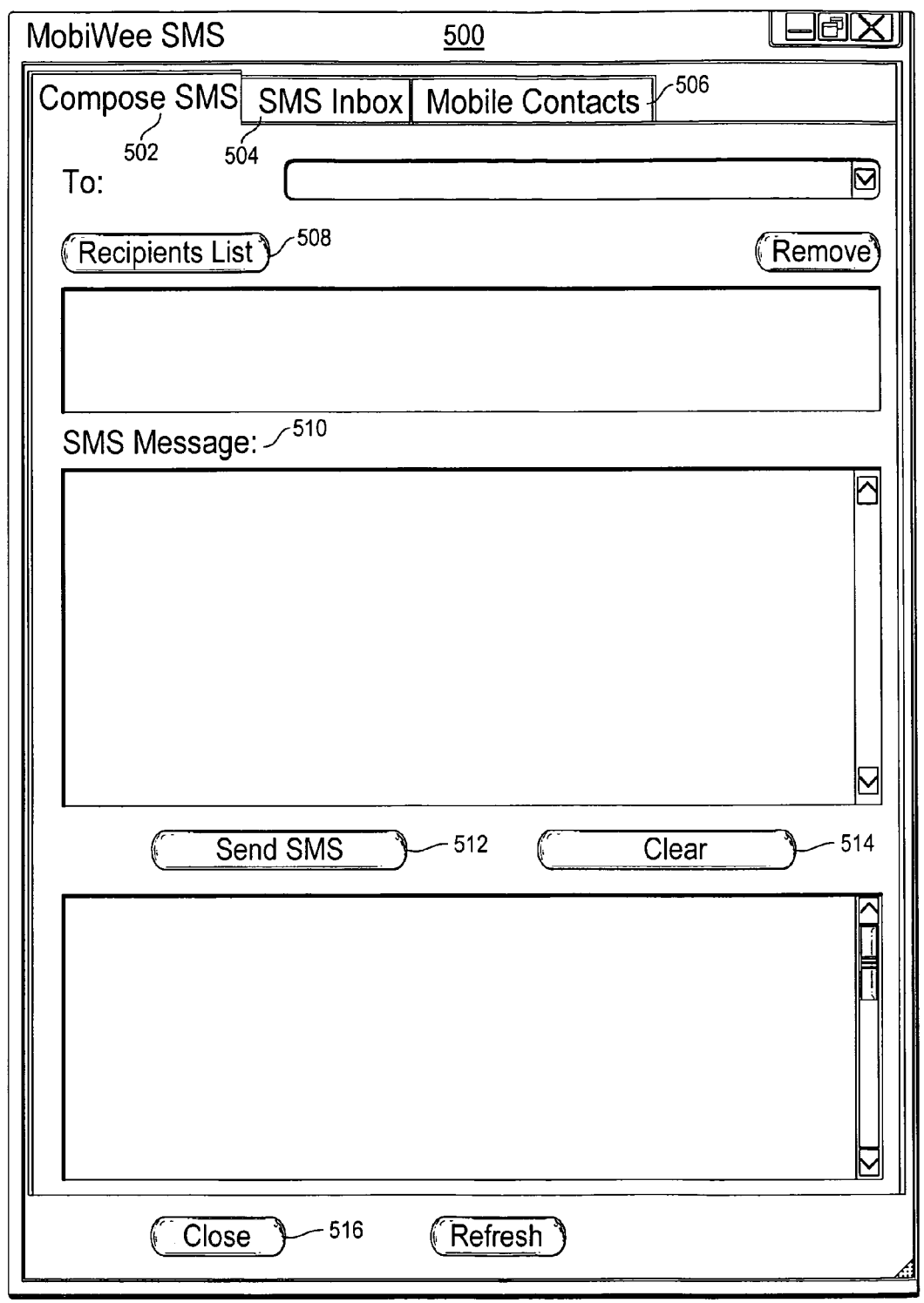
FIG. 5 is a screen menu for selecting SMS message functions of the server-based files and tasks brokerage of FIGS. 1 and 2.

With reference to FIG. 5, an SMS menu 500 allows sending and receiving SMS messages and managing contacts. Clicking on the "Compose SMS" tab brings forward a menu for writing and sending SMS messages. Clicking on the "Recipients List" softbutton 508 allows a selection of one or more recipients for the SMS message. The user may compose an SMS message in the window below the "SMS Message:" header 510. Clicking the "Send SMS" softbutton 512 sends a request via the global communication network to a requested device such as a mobile telephone or mobile telephone equipped PDA to send the SMS message over a cellular telephonic network to the one or more recipients. Clicking the "Clear" softbutton 514 clears the message from the window. Clicking the "Close" softbutton 516 closes the SMS menu 500.

Clicking on the "SMS Inbox" tab 504 brings forward a list of SMS messages previously received by a requested device such as a mobile telephone and previously downloaded from the mobile telephone to the file repository, acting upon a request sent to the mobile telephone. Clicking on the "Mobile Contacts" tab 506 brings forward a menu for downloading contacts from a mobile telephone, uploading contacts to a mobile telephone, or editing a contacts list. Contact management allows a contact be added to or removed from a contact list, and allows a contact list to be backed up, restored, or externally transferred from one device to another. Data including categories and profiles may be similarly managed. A contact may be added upon a missed call. Interactions between a requesting device such as a computer and a requested device such as a mobile telephone are brokered by the server-based files and tasks brokerage 100, using requests and notifications as described.

Figure 6:
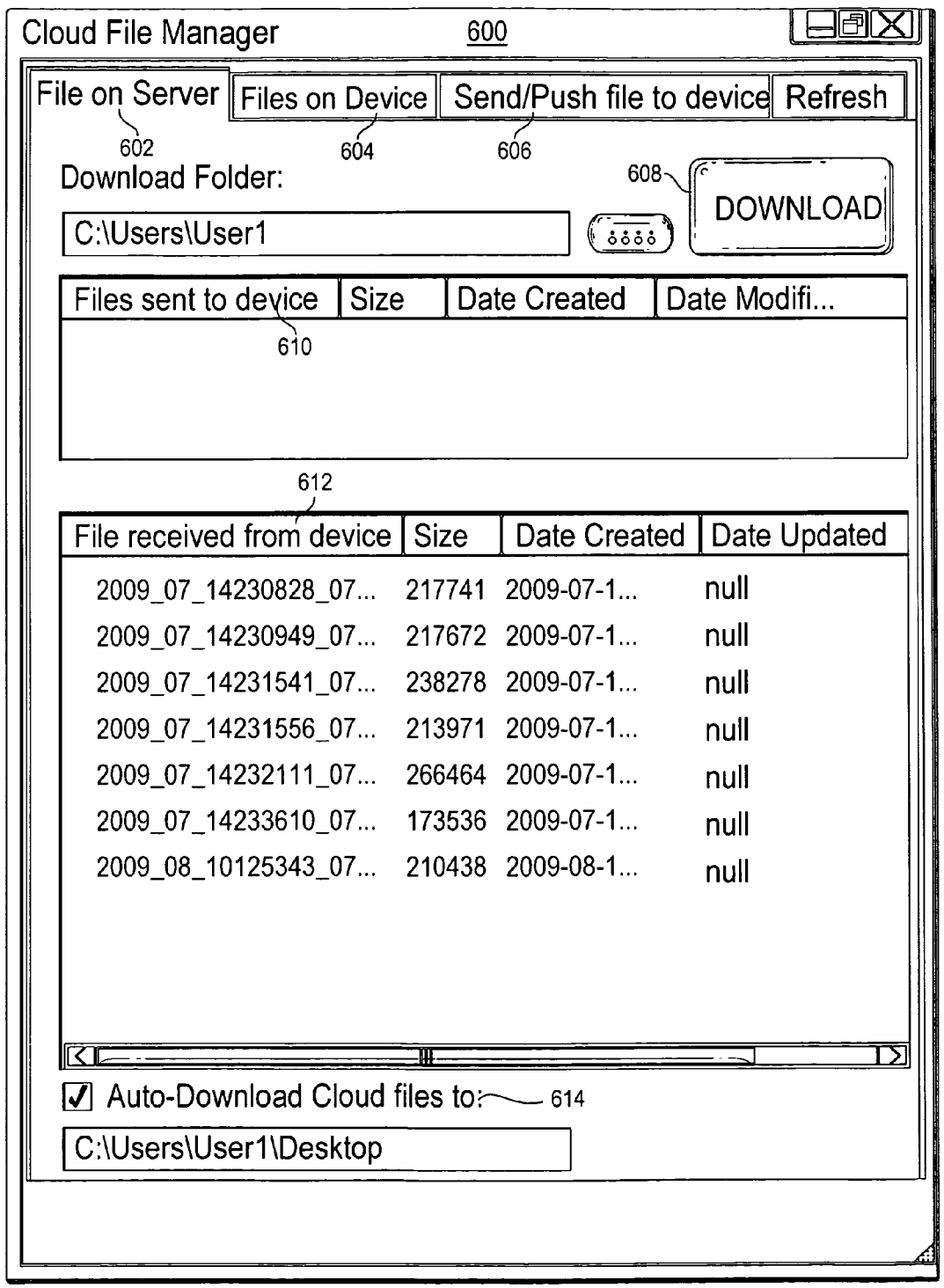
FIG. 6 is a screen menu for selecting file managing functions of the server-based files and tasks brokerage of FIGS. 1 and 2.

With reference to FIG. 6, a file manager menu 600 allows managing of files on remote devices and in the file repository. Clicking on the "File on Server" tab 602 brings forward a menu for viewing lists of files. The lists are maintained on the server, and are available regardless of connectivity of receiving or sending devices. A "Files Sent to Device" list 610 shows files sent to a specified device. A "Files Received from Device" list 612 shows files received from a specified device. Checking the "Auto-Download Cloud Files to:" checkbox sets up an automatic download to the specified destination. Requests and notifications may perform handshaking functions for automated uploads or downloads.

The server maintains a list of files available for each of a number of computing devices, each list showing the files available on the associated computing device. Filenames or file directories may be downloaded periodically or on an event-driven basis by the server from each computing device, while or when the computing device is connected to the server via the global communication network. In this manner, a list of files associated with a requested device is viewable by a requesting device even when the requested device is not connected to the global communication network. A requesting device may select a file to be transferred from the requested device to the file repository on the server, and from the file repository on the server to the requesting device. Similarly, a requesting device may transfer a file from the requesting device to the file repository on the server, and select the file to be transferred from the file repository on the server to the requested device. Thus, a file transfer may be effected in either direction even though the sending and receiving devices are not connected to the global communication network, to the server, or to each other at the same time.

Additional functions or services may be implemented and provided by the server-based files and tasks brokerage 100. A requesting device may send a request to a requested device to on-demand or automatically download a file, files of a specified type or a class of files. The file or files may be presently available on the requested device, or may be files to be generated by or otherwise available on the requested device on an ongoing basis. The server may be programmed to automatically upload files of a specified type or class from the file repository to a requesting device.

An event can trigger a request, an execution of a task or a notification. An event can be timer-based, manually or remotely triggered, or location-based. An external event can be a trigger, such as the arrival of a push message which can be http, SIP/SMS, UDP/TCP/Peer-To-Peer, TCP, Bluetooth or cable packets.

For example, the requesting device may send a request to a camera-equipped cellular telephone to automatically download via the global communication network one or more subsequently captured digital photographs. If the server is programmed to automatically upload digital photographs from the file repository to a home computer as the requesting device, then digital photographs taken on a mobile telephone will be automatically transferred (pushed) to the home computer.

For a further example, the requesting device may send a request to a GPS equipped mobile telephone connected to the global communication network, to periodically or on an event-driven basis return geographical location information. The server may be programmed to automatically upload (push) the geographical location information to a home computer. In this manner, a parent may track the whereabouts of a child carrying the mobile telephone.

Similarly, authorities may track the whereabouts of a parolee carrying a similar device. The requesting device may send a request to the requested device to report or otherwise act on an event occurrence, such as detecting a GPS-based location which is out of bounds or otherwise in violation of a parole requirement. Location may be linked to a calendar application for a security application or an alternative to jail in a law enforcement application.

A mobile telephone may be requested to push call information on the occurrence of each call as acting on an event. The call information may be stored in the file repository in a call log. The server may be programmed to automatically send the call log, each time the call log is updated, from the file repository to a requesting device. The requesting device may be an interactive automotive electronics device, automatically displaying the call log on a screen in an automobile. The requesting device may be a telematics device or an Internet connected picture display. The requesting device may be a set top box, displaying the call log automatically in a viewing area on the television screen.

Further examples of tasks which a mobile telephone may be requested to perform include erasing data, shutting down the device, restarting the device, installing an application, updating an application, importing a certificate, installing a certificate, exporting a certificate, revoking a certificate, updating a certificate or activating a security feature or function. A mobile telephone may be requested to capture a certificate/digital badge, PKI certificates and/or keys from various digital formats for example from a PC or storage devices, a TPM Chip, a certificate information store, a certificate authority (CA) server or source/feed such as Verisign, certificate files in a device storage or a device database, or from server storage files or a database. A mobile telephone may be requested to encrypt and upload files and/or a message to the server and post to a queue for processing by the server or other devices. A mobile telephone may be requested to retrieve a certificate, decrypt and install the certificate on the device in a personal, intermediate or root directory or in any specified device's location including a TPM Chip, a Mobile TPM chip or the mobile phone's SIM or storage cards or peripherals. A certificate may stay on a server or be removed based on server policies. The user may have the ability, with a single click, to provision devices with a certificate from a PC client, a browser or from other platforms that support web services, certificate and I/O operations.

Authentication and other security tasks may be performed in an enterprise solution. Such a solution may be implemented at wireless access points associated with devices and/or servers, or on the edge of the network, for example with VPN, reverse proxy, application servers, network equipment and load balancers. In an example, an application running ActiveX on Windows the MobiWee API's can be executed by Java or ActiveX to extract a certificate based on a filter from a user PC or device, upload the certificate to the "cloud", and deploy the certificate to a mobile device seamlessly with minimal user interaction. This will provide a strong authentication solution for corporate IT, carriers, service providers, manufacturers, automotive or infotainment providers.

Client software on a mobile telephone may implement a proxy agent on the device, taking action on device events such as SMS message arrival or transmission, an incoming call or incoming e-mail. The agent/proxy may detect the event, capture data associated with the event from the client device, capture display GUI images, videos, a screen (if applicable) and data on the display, capture any relevant data for the event from files, a database, hardware, input/output (I/O) devices or memory, CPU or GBU, and upload the data to a "cloud" service, encrypting and storing the data for other devices for the user or another authorized user. In an example, when a mobile telephone rings while a user is occupied with driving an automobile, the screen of the mobile telephone is captured along with the telephone number, and the data is displayed on a car computer on the dashboard, complying with applicable safety rules and regulations. The system can display SMS messages and allow a user to respond to SMS and dialback using a touchscreen on the dashboard. In a further example, when a mobile telephone rings or an SMS message arrives on the mobile telephone, the device status or the SMS message can be displayed on a connected display or television or other device connected to the "cloud".

"Cloud" services can be a hosted server, cluster or server distributed worldwide (WW), a private "cloud" for a specific user, a "cloud" for a specific service provider, enterprise or original device manufacturer/network equipment provider (ODM/NEP), micro "cloud" hosted on a vehicle, airplane or other similar application, or a system within a system.

Client software installed on each of the requesting device, the requested device and the server is specific to the device. Operating the client software, the devices negotiate and communicate in various protocols which may include but are not limited to TCP, UDP, SMS, http, SIP or Peer-To-Peer, in a secure, un-secure or mixed mode, depending on the data transferred and based on user or administrator options. Protocols and capabilities are implemented using native device operating system (OS) commands and capabilities. Various supported programming languages can be used.

Commands may be sent and performed by an agent, operating client software, using OMA DM or a Native OS application programming interface (API). For enhanced manageability and security, telephony application programming interface (TAPI) may be used.

Messages may be encrypted, such as by AES/3D encrypted XML remitted over secure SSL. Data can be double encrypted using secure sockets layer (SSL) and advanced encryption standard (AES) or 3DES. Client software may use multi-factor authentication parameters such as a mixture of password, key, token, device hardware parameters, SIM card parameters and other authentication parameters.

An authentication module acting on the communications between requesting device, server and requested device may make use of a user name and password, a password and an e-mail personal identification number (PIN) code, a password and an SMS PIN, lightweight directory access protocol (LDAP) authentication, LDAP PIN via mail or SMS, certificates, digital badges, single sign-on modules and integration modules or certificates in combination with another security measure. A zero user interaction model may be used, in which the user need not supply additional information but the telephone number, IMEI, IMSI or message authentication code (MAC) is used. A mobile telephone may send an SMS message to itself to capture an extra authentication token. An ActiveX component may extract certificates and Digital badges from a computing device and install them in a mobile device or remote device. The mobile device or remote device may then authenticate with routers, wireless gateways, a virtual private network (VPN) or the edge of a network.

Implementation may take the form of an enterprise solution, a cloud service, a free community and social networking service, or a mixed mode optimized between Internet service, an intranet and a demilitarized zone (DMZ). Various combinations of a firewall, a demilitarized zone, an intranet with authentication and communication on the Internet, a portal, data residing in a distributed manner, mirrored fields, types of cloud servers, main servers, cloud service or mixed mode service may be used.

Files or data may be cached or saved on the server for a specified period of time, depending on a policy or application. Files may include application data, images, media, encrypted or unencrypted files. Files may be saved for later retrieval or backup and restore operations, or may be deleted after retrieval by an intended service or device. Files may be backed up from one device, then restored to a new or replacement device in case of theft, loss of the original device or upgrade to a new device.

Client software may be programmed or selected by user option to operate in the background or to operate only when expressly enabled during a user session. Background operation has advantages in that a device may be requested to perform an operation upon a subsequent activation and connection to the server, without requiring that a user directly enable the client software during each session. As an example, a stolen or lost mobile phone may be requested to lock or wipe data, without requiring that a thief or a person finding the mobile phone expressly activate the client software. Background client software may boot up and operate when the mobile phone is turned on, regardless of whether the mobile phone is turned on by the original owner. Client software may even be programmed to operate if, for example, a SIM card is replaced, allowing locking, encryption or wiping upon command and thus protecting a stolen mobile phone from being used with a new SIM card. A requested device may be issued a command to perform call forwarding, as a proxy, with the client software acting on the request.

A software development kit (SDK) allows creating custom agents and optimizes the user experience and interactions. Software development kits may be available for Internet connectable appliances, televisions, telematics, automotive, set top box (STB), game consoles or other applications. Mobile telephone data and remote device data may be displayed on an interactive graphical user interface (GUI) operating under any of various operating systems. As an example, missed calls, a file arriving, a screen capture from a mobile phone, an arriving SMS message, a location of the device, a digital photograph from the device, or other information from a remote device may be brokered by the system and relayed to a requesting device for display or other use. The relaying may be on demand or automatic, at one or both ends. In this manner, SMS messages arriving at a mobile telephone may be automatically relayed end-to-end to a home computer. Digital photographs being taken using a camera-equipped mobile telephone may be automatically relayed end-to-end to a home computer.

A sharing module may allow users to share and interact with other user devices for sharing files, contacts or location. Multiple users may use the server-based files and tasks brokerage 100 in a collaborative effort.

As disclosed herein, the method and system for a server-based files and tasks brokerage provides a mechanism for file transfers and task request transfers between computing and communication devices connected in overlapping or non-overlapping sessions to a server. The server acts to broker the transactions, transfers and communications, so that a request may be made and acted upon even when one device is not directly connected to the other device or both devices are not connected at the same time to the server.

What is claimed is:

1. A method for operating a server-based files and tasks brokerage, the method comprising:
    posting a request to a request queue associated with a requesting one of a plurality of computing devices and communicating with a server, in response to receiving the request at the server via a global communication network from the requesting device, the request being for a requested one of a plurality of mobile telephonic devices to perform a task;
    posting a first notification to a first notification queue associated with the requested device and communicating with the server, in response to receiving the request, the notification identifying the requesting device;
    pushing the first notification from the first notification queue to the requested device upon the server confirming a connection of the requested device to the server via the global communication network;
    transferring a file from a file repository communicating with the server to the requested device upon the server detecting that a first condition of the task is for the requested device to receive the file and the server confirming the connection of the requested device;
    transferring a file to the file repository from the requested device upon the server detecting that a second condition of the task is a for the requested device to send the file and the server confirming the connection of the requested device; and
    posting a second notification to a second notification queue associated with the requesting device and communicating with the server, in response to the server confirming a completion of the task by the requested device;
    wherein the server is programmed to receive the request, to post the request and to post the first notification, irrespective of connectivity to the server of the requested device, and programmed to push the first notification, to conditionally transfer the file, and to post the second notification irrespective of connectivity to the server of the requesting device.

2. The method of claim 1 further comprising pushing the second notification from the second notification queue to the requesting device upon the server confirming a connection of the requesting device to the server via the global communication network.

3. The method of claim 1 further comprising transferring the file from the requesting device to the file repository upon the first condition and the server confirming the connection of the requesting device.

4. The method of claim 1 further comprising transferring the file from the file repository to the requested device upon the first condition and the server confirming the connection of the requested device.

5. The method of claim 1 further comprising transferring the file from the requested device to the file repository upon the second condition and the server confirming the connection of the requested device.

6. The method of claim 1 wherein the task is to send an SMS message over a wireless telephonic network from the requested device, the SMS message originating from the requesting device.

7. The method of claim 1 wherein the task is to automatically download via the global communication network a subsequently captured digital photograph from a camera-equipped cellular telephone to the file repository.

8. The method of claim 1 wherein the task is to return geographical location information from the requested device.

9. The method of claim 1 wherein the task is to lock the requested device.

10. The method of claim 1 wherein the task is to erase a specified type or class of data on the requested device.

11. The method of claim 1 wherein the task includes acting on an event occurrence at the requested device.

12. The method of claim 1 further comprising automatically uploading files of a specified type or class from the file repository to the requesting device.

13. The method of claim 1 further comprising:
    retrieving the first notification from the first notification queue to the requested device upon connecting to the server via the global communication network;
    retrieving the request from the request queue to the requested device via the global communication network, in response to determining an identity of the requesting device from the first notification;
    performing the task on the requested device in response to retrieving the request; and
    sending a confirmation to the server from the requested device via the global communication network upon completing the task;
    wherein the requested device is programmed to retrieve the first notification, to retrieve the request, to perform the task and to send the confirmation irrespective of the connectedness to the server of the requesting device.

14. A server-based files and tasks brokerage system comprising:
    a server accessible via a global communication network to a plurality of computing devices and to a plurality of mobile telephonic devices;
    the server being programmed to broker files and tasks by:
        posting a request to a request queue associated with a requesting one of the plurality of computing devices and communicating with the server, in response to receiving the request at the server via the global communication network from the requesting device, the request being for a requested one of the plurality of mobile telephonic devices to perform a task;
        posting a first notification to a first notification queue associated with the requested device and communicating with the server, in response to receiving the request, the notification identifying the requesting device;

pushing the first notification from the first notification queue to the requested device upon the server confirming a connection of the requested device to the server via the global communication network;

transferring a file from a file repository communicating with the server to the requested device upon a first condition of the task being for the requested device to receive the file and the server confirming the connection of the requested device;

transferring a file to the file repository from the requested device upon a second condition of the task being for the requested device to send the file and the server confirming the connection of the requested device; and posting a second notification to a second notification queue associated with the requesting device and communicating with the server, in response to the server confirming a completion of the task by the requested device;

wherein the server is programmed to receive the request, to post the request and to post the first notification, irrespective of connectivity to the server of the requested device, and programmed to push the first notification, to conditionally transfer the file, and to post the second notification irrespective of connectivity to the server of the requesting device.

15. The system of claim 14 wherein the server is further programmed to broker files and tasks by pushing the second notification from the second notification queue to the requesting device upon the server confirming a connection of the requesting device to the server via the global communication network.

16. The system of claim 14 wherein the server is further programmed to broker files and tasks by transferring the file from the requesting device to the file repository upon the first condition and the server confirming the connection of the requesting device.

17. The system of claim 14 wherein the server is further programmed to broker files and tasks by transferring the file from the file repository to the requested device upon the first condition and the server confirming the connection of the requested device.

18. The system of claim 14 wherein the server is further programmed to broker files and tasks by transferring the file from the requested device to the file repository upon the second condition and the server confirming the connection of the requested device.

19. The system of claim 14 wherein the task is to send an SMS message over a wireless telephonic network from the requested device, the SMS message originating from the requesting device.

20. The system of claim 14 wherein the task is to automatically download via the global communication network a subsequently captured digital photograph from a camera-equipped cellular telephone to the file repository.

21. The system of claim 14 wherein the task is to return geographical location information from the requested device.

22. The system of claim 14 wherein the task is to lock the requested device.

23. The system of claim 14 wherein the task is to erase a specified type or class of data on the requested device.

24. The system of claim 14 wherein the task includes acting on an event occurrence at the requested device.

25. The system of claim 14 wherein the server is further programmed to broker files and tasks by automatically uploading files of a specified type or class from the file repository to the requesting device.

26. The system of claim 14 further comprising:
one of the plurality of mobile telephonic devices being the requested device;
the requested device being programmed to interact with the server by:
retrieving the first notification from the first notification queue to the requested device upon connecting to the server via the global communication network;
retrieving the request from the request queue to the requested device via the global communication network, in response to determining an identity of the requesting device from the first notification;
performing the task on the requested device in response to retrieving the request; and
sending a confirmation to the server from the requested device via the global communication network upon completing the task;
wherein the requested device is programmed to retrieve the first notification, to retrieve the request, to perform the task and to send the confirmation irrespective of the connectedness to the server of the requesting device.

27. The method of claim 1 wherein the file transferred to the file repository from the requested device includes a first contact list, the method further including:
assembling a third contact list from the first contact list and a second contact list.

28. The method of claim 27 further comprising transferring the first, second or third contact list from the file repository to a one of the plurality of mobile telephonic devices or to a one of the plurality of computing devices.

29. The method of claim 1 wherein the task is for the requested mobile telephonic device to push call information in response to an occurrence of a call, the method further including:
storing the call information in a call log in the file repository.

30. The method of claim 29 further comprising:
transferring the call log from the file repository to a one of the computing devices or to a one of the mobile telephonic devices; and
displaying the call log on the computing device or the mobile telephonic device.

31. The method of claim 1 wherein the file transferred to the file repository from the requested device includes a first contact list, the method further including:
deleting a contact from the first contact list.

32. The method of claim 1 wherein the file transferred to the file repository from the requested device includes a first contact list, the method further including:
adding a contact to the first contact list.

33. The method of claim 1 wherein the file transferred to the file repository from the requested device includes a first contact list, the method further including:
transferring the file including the first contact list from the file repository to a one of the plurality of mobile telephonic devices differing from the requested device in response to a request to transfer the contact list.

34. The method of claim 1 wherein the file transferred to the file repository from the requested device includes a first contact list, the method further including:
transferring the file including the first contact list from the file repository to the requested device in response to a request to restore the contact list.

35. The system of claim 14 wherein:
the file transferred to the file repository from the requested device includes a first contact list; and the server is further programmed to broker files and tasks by assembling a third contact list from the first contact list and a second contact list.

36. The system of claim 35 wherein the server is further programmed to broker files and tasks by transferring the first, second or third contact list from the file repository to a one of the plurality of mobile telephonic devices or to a one of the plurality of computing devices.

37. The system of claim 14 wherein:
the task is for the requested mobile telephonic device to push call information in response to an occurrence of a call; and
the server is further programmed to broker files and tasks by storing the call information in a call log in the file repository.

38. The system of claim 37 wherein:
the server is further programmed to broker files and tasks by transferring the call log from the file repository to a one of the computing devices or to a one of the mobile telephonic devices; and
the call log is displayed on the computing device or the mobile telephonic device.

39. The system of claim 14 wherein:
the file transferred to the file repository from the requested device includes a first contact list; and
the server is further programmed to broker files and tasks by deleting a contact from the first contact list.

40. The system of claim 14 wherein:
the file transferred to the file repository from the requested device includes a first contact list; and
the server is further programmed to broker files and tasks by adding a contact to the first contact list.

41. The system of claim 14 wherein:
the file transferred to the file repository from the requested device includes a first contact list; and
the server is further programmed to broker files and tasks by transferring the file including the first contact list from the file repository to a one of the plurality of mobile telephonic devices differing from the requested device in response to a request to transfer the contact list.

42. The system of claim 14 wherein:
the file transferred to the file repository from the requested device includes a first contact list; and
the server is further programmed to broker files and tasks by transferring the file including the first contact list from the file repository to the requested device in response to a request to restore the contact list.

\* \* \* \* \*